(12) United States Patent
Perz et al.

(10) Patent No.: US 8,116,543 B2
(45) Date of Patent: Feb. 14, 2012

(54) SYSTEM FOR AND METHOD OF INTELLIGENTLY DIRECTED SEGMENTATION ANALYSIS FOR AUTOMATED MICROSCOPE SYSTEMS

(75) Inventors: Cynthia B. Perz, Huntington Beach, CA (US); Robert T. Ellis, Dana Point, CA (US); Jose De La Torre-Bueno, Carlsbad, CA (US)

(73) Assignee: Carl Zeiss MicroImaging GmbH, Jena (DE)

( * ) Notice: Subject to any disclaimer, the term of this patent is extended or adjusted under 35 U.S.C. 154(b) by 33 days.

(21) Appl. No.: 12/460,079

(22) Filed: Jul. 13, 2009

(65) Prior Publication Data
US 2010/0040266 A1    Feb. 18, 2010

Related U.S. Application Data

(63) Continuation of application No. 11/343,544, filed on Jan. 30, 2006, now abandoned.

(60) Provisional application No. 60/705,096, filed on Aug. 2, 2005.

(51) Int. Cl.
*G06K 9/00* (2006.01)

(52) U.S. Cl. ..................... 382/128

(58) Field of Classification Search .............. 382/128
See application file for complete search history.

(56) References Cited

U.S. PATENT DOCUMENTS

| | | | |
|---|---|---|---|
| 3,824,393 A | 7/1974 | Brain | |
| 3,851,972 A | 12/1974 | Smith et al. | |
| 4,011,004 A | 3/1977 | Levine et al. | |
| 4,125,828 A | 11/1978 | Resnick et al. | |
| 4,196,265 A | 4/1980 | Koprowski et al. | |
| 4,210,419 A | 7/1980 | Castleman | |
| 4,249,825 A | 2/1981 | Shapiro | |
| 4,338,024 A | 7/1982 | Bolz et al. | |
| 4,393,466 A | 7/1983 | Deindoerfer et al. | |
| 4,513,438 A | 4/1985 | Graham et al. | |

(Continued)

FOREIGN PATENT DOCUMENTS

DE    3340647    5/1985

(Continued)

OTHER PUBLICATIONS

File History for U.S. Appl. No. 11/343,544, filed Jan. 30, 2006.

(Continued)

*Primary Examiner* — Brian Werner
*Assistant Examiner* — Nirav G Patel
(74) *Attorney, Agent, or Firm* — Patterson Thuente Christensen Pedersen, P.A.

(57) ABSTRACT

The present disclosure includes systems and techniques relating to intelligently directed segmentation analysis for automated microscope systems. In general, in one implementation, the technique includes obtaining an image of at least a portion of a scan region including a biological specimen, partitioning the obtained image into zelles, determining one or more parameters of the zelles, performing a cluster analysis on the one or more parameters of the zelles, differentiating tissue of greater interest from tissue of lesser interest in the obtained image based on the cluster analysis and based on a test being performed for the biological specimen, and storing more information for the tissue of greater interest than information for the tissue of lesser interest. The cluster analysis can be a multivariate statistical cluster analysis, and the zelles can be test-dependent zelles (e.g., having dimensions defined according to the test being performed for the biological specimen).

20 Claims, 6 Drawing Sheets

U.S. PATENT DOCUMENTS

| | | |
|---|---|---|
| 4,530,040 A | 7/1985 | Petterson |
| 4,612,614 A | 9/1986 | Deindoerfer et al. |
| 4,656,594 A | 4/1987 | Ledley |
| 4,673,973 A | 6/1987 | Ledley |
| 4,700,298 A | 10/1987 | Palcic et al. |
| 4,741,043 A | 4/1988 | Bacus |
| 4,945,220 A | 7/1990 | Mallory et al. |
| 4,965,725 A | 10/1990 | Rutenberg |
| 4,991,223 A | 2/1991 | Bradley |
| 5,003,165 A | 3/1991 | Sarfati et al. |
| 5,008,185 A | 4/1991 | Bacus |
| 5,014,198 A | 5/1991 | Umemura et al. |
| 5,016,173 A | 5/1991 | Kenet et al. |
| 5,018,209 A * | 5/1991 | Bacus .......................... 382/129 |
| 5,068,909 A | 11/1991 | Rutherford et al. |
| 5,085,325 A | 2/1992 | Jones et al. |
| 5,087,965 A | 2/1992 | Torre-Bueno |
| 5,123,055 A | 6/1992 | Kasdan |
| 5,202,931 A | 4/1993 | Bacus |
| 5,231,580 A | 7/1993 | Cheung et al. |
| 5,233,684 A | 8/1993 | Ulichney |
| 5,254,845 A | 10/1993 | Burgess et al. |
| 5,257,182 A | 10/1993 | Luck et al. |
| 5,268,966 A | 12/1993 | Kasdan |
| 5,287,272 A * | 2/1994 | Rutenberg et al. ............. 382/224 |
| 5,317,140 A | 5/1994 | Dunthorn |
| 5,321,545 A | 6/1994 | Bisconte |
| 5,333,207 A | 7/1994 | Rutenberg |
| 5,338,924 A | 8/1994 | Barrett et al. |
| 5,352,613 A | 10/1994 | Tafas et al. |
| 5,375,177 A | 12/1994 | Vaidanathan et al. |
| 5,409,007 A | 4/1995 | Saunders et al. |
| 5,428,690 A | 6/1995 | Bacus et al. |
| 5,432,871 A | 7/1995 | Novik |
| 5,449,622 A | 9/1995 | Yabe et al. |
| 5,459,384 A | 10/1995 | Engelse et al. |
| 5,463,470 A | 10/1995 | Terashita et al. |
| 5,469,353 A | 11/1995 | Pinsky et al. |
| 5,473,706 A | 12/1995 | Bacus et al. |
| 5,481,401 A | 1/1996 | Kita et al. |
| 5,499,097 A | 3/1996 | Ortyn et al. |
| 5,515,172 A | 5/1996 | Shiau |
| 5,526,258 A | 6/1996 | Bacus |
| 5,533,628 A | 7/1996 | Tao |
| 5,555,038 A | 9/1996 | Conway |
| 5,583,666 A | 12/1996 | Ellson et al. |
| 5,585,469 A | 12/1996 | Kojima et al. |
| 5,602,941 A | 2/1997 | Charles et al. |
| 5,619,032 A | 4/1997 | Kasdan |
| 5,625,705 A | 4/1997 | Recht |
| 5,625,709 A | 4/1997 | Kasdan |
| 5,627,907 A | 5/1997 | Gur et al. |
| 5,635,402 A | 6/1997 | Alfano et al. |
| 5,646,677 A | 7/1997 | Reber |
| 5,647,025 A | 7/1997 | Frost et al. |
| 5,671,288 A | 9/1997 | Wilhelm et al. |
| 5,690,892 A | 11/1997 | Babler et al. |
| 5,691,779 A | 11/1997 | Yamashita et al. |
| 5,701,172 A | 12/1997 | Azzazy |
| 5,706,093 A | 1/1998 | Komiya |
| 5,726,009 A | 3/1998 | Connors et al. |
| 5,735,387 A | 4/1998 | Polaniec et al. |
| 5,740,270 A | 4/1998 | Rutenberg et al. |
| 5,783,814 A | 7/1998 | Fairley et al. |
| 5,799,105 A | 8/1998 | Yang Tao |
| 5,846,749 A | 12/1998 | Slamon et al. |
| 5,854,851 A | 12/1998 | Bamberger et al. |
| 5,867,598 A | 2/1999 | Queiroz |
| 5,877,161 A | 3/1999 | Riabowol |
| 5,880,473 A | 3/1999 | Ginestet |
| 5,888,742 A | 3/1999 | Lal et al. |
| 5,889,881 A | 3/1999 | MacAulay et al. |
| 5,911,003 A | 6/1999 | Sones |
| 5,911,327 A | 6/1999 | Tanaka et al. |
| 5,966,309 A | 10/1999 | O'Bryan et al. |
| 5,966,465 A | 10/1999 | Keith et al. |
| 5,978,498 A | 11/1999 | Wilhelm et al. |
| 6,005,964 A | 12/1999 | Reid et al. |
| 6,006,191 A | 12/1999 | DiRienzo |
| 6,007,996 A | 12/1999 | McNamara et al. |
| 6,011,595 A | 1/2000 | Henderson et al. |
| 6,031,929 A | 2/2000 | Maitz et al. |
| 6,040,139 A | 3/2000 | Bova |
| 6,058,322 A | 5/2000 | Nishikawa et al. |
| 6,072,570 A | 6/2000 | Chipman et al. |
| 6,097,838 A | 8/2000 | Klassen et al. |
| 6,101,265 A | 8/2000 | Bacus et al. |
| 6,117,985 A | 9/2000 | Thomas et al. |
| 6,122,400 A | 9/2000 | Reitmeier |
| 6,125,194 A | 9/2000 | Yeh et al. |
| 6,141,602 A | 10/2000 | Igarashi et al. |
| 6,151,405 A | 11/2000 | Douglass et al. |
| 6,151,535 A | 11/2000 | Ehlers |
| 6,155,699 A | 12/2000 | Miller et al. |
| 6,169,816 B1 | 1/2001 | Ravkin |
| 6,215,892 B1 | 4/2001 | Douglass et al. |
| 6,215,894 B1 | 4/2001 | Zeleny et al. |
| 6,225,636 B1 | 5/2001 | Ginestet |
| 6,226,392 B1 | 5/2001 | Bacus et al. |
| 6,236,031 B1 | 5/2001 | Ueda |
| 6,238,892 B1 | 5/2001 | Mercken et al. |
| 6,259,807 B1 | 7/2001 | Ravkin |
| 6,259,826 B1 | 7/2001 | Pollard et al. |
| 6,272,235 B1 | 8/2001 | Bacus et al. |
| 6,275,777 B1 | 8/2001 | Shimizu |
| 6,281,874 B1 | 8/2001 | Sivan et al. |
| 6,290,907 B1 | 9/2001 | Takahashi et al. |
| 6,313,452 B1 | 11/2001 | Paragano et al. |
| 6,330,349 B1 | 12/2001 | Hays et al. |
| 6,366,017 B1 | 4/2002 | Antoniadis et al. |
| 6,374,989 B1 | 4/2002 | Van Dyke, Jr. et al. |
| 6,404,906 B2 | 6/2002 | Bacus et al. |
| 6,404,916 B1 | 6/2002 | De La Torre-Bueno |
| 6,415,058 B2 | 7/2002 | Grohs et al. |
| 6,418,236 B1 | 7/2002 | Ellis et al. |
| 6,445,817 B1 | 9/2002 | De la Torre-Bueno |
| 6,466,690 B2 | 10/2002 | Bacus et al. |
| 6,514,722 B2 | 2/2003 | Palsson et al. |
| 6,518,554 B1 | 2/2003 | Zhang |
| 6,546,123 B1 | 4/2003 | McLaren et al. |
| 6,553,135 B1 | 4/2003 | Douglass et al. |
| 6,631,203 B2 | 10/2003 | Ellis et al. |
| 6,671,393 B2 | 12/2003 | Hays et al. |
| 6,674,896 B1 | 1/2004 | Torre-Bueno |
| 6,697,509 B2 | 2/2004 | De La Torre-Bueno |
| 6,718,053 B1 | 4/2004 | Ellis et al. |
| 2002/0067409 A1 | 6/2002 | Harari et al. |
| 2002/0164810 A1 | 11/2002 | Dukor et al. |
| 2003/0124589 A1 | 7/2003 | Piper |
| 2003/0163031 A1 | 8/2003 | Madden et al. |
| 2003/0170703 A1 | 9/2003 | Piper et al. |
| 2004/0202357 A1* | 10/2004 | Perz et al. ..................... 382/128 |
| 2005/0163398 A1* | 7/2005 | Ioka ............................. 382/284 |
| 2005/0260572 A1* | 11/2005 | Kato et al. ........................ 435/6 |
| 2007/0135999 A1 | 6/2007 | Kolatt |
| 2009/0208134 A1* | 8/2009 | Eichhorn et al. .............. 382/282 |

FOREIGN PATENT DOCUMENTS

| | | |
|---|---|---|
| DE | 3735091 | 4/1998 |
| EP | 0213666 A1 | 3/1987 |
| EP | 0557871 A2 | 9/1993 |
| EP | 0713086 A1 | 5/1996 |
| JP | 2003268042 A | 9/2003 |
| WO | WO 92/17848 A1 | 10/1992 |
| WO | WO 97/20198 A2 | 6/1997 |
| WO | WO 00/49391 A1 | 8/2000 |
| WO | WO 01/37206 A1 | 5/2001 |
| WO | WO 03/014795 A1 | 2/2003 |

OTHER PUBLICATIONS

Aziz, Douglas C., "Quantitation of Estrogen and Progesterone Receptors by Immunicytochemical and Image Analyses", *Anatomic Pathology*, vol. 98, No. 1, Jul. 1991, 7 Pgs.

Bacus, et al., "The Evaluation of Estrogen Receptor in Primary Breast Carcinoma by Computer-Assisted Image Analysis", *A.J.C.P.*, Sep. 1988, 7 Pgs.

Baddoura, et al., "Image Analysis for Quantitation of Estrogen Receptor in Formalin-Fixed Paraffin-Embedded Sections of Breast Carcinoma", *Modern Pathology*, vol. 4, No. 1, 1991, 5 Pgs.

Ballard, et al., *Computer Vision*, Chapter 3, "Early Processing", pp. 65-70; Chapter 5, pp. 149-165, © 1982 by Prentice Hall, Inc., Englewood Cliffs, New Jersey, 25 Pgs.

Bander, Neil H., "Monoclonal Antibodies to Renal Cancer Antigens", *Eur Urol* Aug. 1990: vol. 18(suppl 2): 10-12, 5 Pgs.

Castleman, Kenneth R., *"Digital Image Processing"*, pp. 451-460 and 551-554, © 1996 by Prentice-Hall, Inc., Simon & Schuster Company/A Viacom Company, Upper Saddle River, New Jersey, Library of Congress Cataloging-in-Publication Data, 1996, 15 Pgs.

Caulet, S., et al., "Comparative Quantitative Study of Ki-67 Antibody Staining in 78 B and T Cell Malignant Lymphoma (ML) Using Two Image Analyser Systems", *Path. Res. Pract.*, 188, 490-496 (1992), 7 Pgs.

ChromaVision, "Products" website printout dated Apr. 15, 2004, http://www.chromavision.com/product/index.htm. 20 Pgs.

Diamond, et al., "Computerized Image Analysis of Nuclear Shape as a Prognostic Factor for Prostatic Cancer", *The Prostate* 3:321-332 (1982), 12 Pgs.

Drobnjak, et al., "Immunocytochemical, Detection of Estrogen and Progesterone Receptors (ER/PR) in Paraffin Sections of Human Breast Carcinoma, Correlation with Biochemical Analysis and Automated Imaging Quantitation", Annual Meeting Abstracts, *Journal of the Academy of Pathology*, vol. 64, No. 1, Jan. 1991, 3 Pgs.

Duda, R.O., et al., *"Pattern Classification and Scene Analysis"*, pp. 228-239 and 276-284, ©1973, by John Wiley & Sons, Inc., 23 Pgs.

Enestrom, et al., "Quantitative Ultrastructural Immunocytochemistry Using a Computerized Image Analysis System", *Stain Technology*, vol. 65, No. 6, pp. 263-278, © 1990, 16 Pgs.

Esteban, et al., "Quantification of Estrogen Receptors on Paraffin-Embedded Tumors by Image Analysis", *Modern Pathology*, vol. 4, No. 1, 1991, 6 Pgs.

Gross, Douglas S. et al., "Quantitative Immunocytochemistry of Hypothalamic and Pituitary Hormones: Validation of an Automated, Computerized Image Analysis System", *The Journal of Histochemistry and Cytochemistry*, vol. 33, No. 1, 1985, 10 Pgs.

Horsfall, D.J. et al., "Immunocytochemical Assay for Oestrogen Receptor in Fine Needle Aspirates of Breast Cancer by Video Image Analysis", *Br. J. Cancer* (1989), 59, 129-134, 6 Pgs.

Huffman, "A Method for the Construction of Minimum-Redundancy Codes", *Proceedings of the I.R.E.*, Sep. 1952, 4 Pgs.

Kerns, B.J. et al., Abstract of Article Entitled "Estrogen Receptor Status Evaluated in Formalin-Fixed Paraffin Embedded Breast Carcinomas Determined by Automated Immunohistochemistry and Image Analysis", *Proceedings of the American Association for Cancer Research*, vol. 35, Mar. 1994, 1 Pg.

Ledley, R.S. et al., "Fundamentals of True-Color Image Processing", *IEEE*, 1990, 5 Pgs.

Levine, Gary M. et al., "Quantitative Immunocytochemistry by Digital Image Analysis: Application to Toxicologic Pathology", *Xicologic Pathology* ISSN:0192-6233, vol. 15, No. 3, 1987, 5 Pgs.

Maudelonde, T. et al., "Immunostaining of Cathepsin D in Breast Cancer: Quantification by Computerised Image Analysis and Correlation with Cytosolic Assay", *Eur T Cancer*, vol. 28A, No. 10, 1992, 6 Pgs.

McClelland, R.A. et al., "A Multicentre Study into the Reliability of Steroid Receptor Immunocytochemical Assay Quantification", *Eur J Cancer*, vol. 27, No. 6, 1991, 6 Pgs.

McClelland, R.A. et al., "Automated Quantitation of Immunocytochemically Localized Estrogen Receptors in Human Breast Cancer", *Cancer Research 50*, Jun. 15, 1990, 6 Pgs.

McKeogh et al., "A Low-Cost Automatic Translation and Autofocusing System for a Microscope", *Measurement Science and Technology*, IOP Publishing, Bristol, GB, vol. 6, No. 5, May 1, 1995, 6 Pgs.

Mize, R. Ranney et al., "Quantitative Immunocytochemistry Using an Image Analyzer. I. Hardware Evaluation, Image Processing, and Data Analysis", *Journal of Neuroscience Methods*, 26 (1988), 23 Pgs.

Pratt, William K., *Digital Image Processing*, $2^{nd}$ Edition, A Wile-Interscience Publication, 1991, 28 Pgs.

Press, Michael F. et al., "Her-2/*nue* Expression in Node-Negative Breast Cancer: Direct Tissue Quantitation by Computerized Image Analysis and Association of Overexpression with Increased Risk of Recurrent Disease", *Cancer Research 53*, Oct. 1993, 11 Pgs.

Roca et al., "New autofocusing algorithm for cytological tissue in a microscopy environment", *Optical Engineering*, vol. 27, No. 2, Feb. 1998, 7 Pgs.

Russ, John C., *Image Processing Handbook*, $2^{nd}$ Edition, Library of Congress Cataloging-in-publication Data, 1995, 3 Pgs.

Schultz, Daniel S. et al., "Comparison of Visual and CAS-200 Quantitation of Immunocytochemical Staining in Breast Carcinoma Samples", *Analytical and Quantitative Cytology and Histology*, vol. 14, No. 1, Feb. 1992, 6 Pgs.

Unnerstall et al., "New Approaches to Quantitative Neuropathology: Multivariate Analysis of Morphologic and Neurochemical Measures" *Neurobiology of Aging*, vol. 8, 1987, 3 Pgs.

\* cited by examiner

SYSTEM FOR AND METHOD OF INTELLIGENTLY DIRECTED SEGMENTATION ANALYSIS FOR AUTOMATED MICROSCOPE SYSTEMS

RELATED APPLICATION

This application is a continuation of application Ser. No. 11/343,544, filed Jan. 30, 2006, which claims the benefit of U.S. Provisional Application No. 60/705,096, filed Aug. 2, 2005 both of said applications hereby fully incorporated herein by reference.

BACKGROUND OF THE INVENTION

The microscopic examination of tissue or tissue components is a common and valuable practice in both medicine and biology. Such procedures typically rely on the visual appearance of the tissue which is often enhanced by the use of specialized stains that bind to certain tissue components, foreign bodies, or the products of cellular processes.

With the advent of computer technology, it has now become possible to automate many of the manual examination procedures by using a computer-controlled microscope to image a microscope slide, digitize the images, and place them into the memory of a computer for subsequent analysis, display, and storage.

Most automated microscope imaging systems do not have the ability to predict in advance what a pathologist or user may determine is interesting or important on a slide containing a biological sample. Current automated systems, therefore, capture and store high-quality, images of the entire microscope slide. Using a high-power objective, such as a 60× or 100× objective, the field of view is quite small relative to the overall area of the biological sample. Therefore, the system takes many images to cover the entire area of the microscope slide. Each high-power image requires significant storage capacity. A database of information and images of an entire microscope slide can quickly begin to overwhelm available resources. In addition, only a fraction of the information and images saved may be of any interest or be used by a pathologist or other user in making a diagnostic evaluation. The remaining information and images may be of little to no value.

Improving automated imaging systems depends on the ability of the system to automate portions of the tissue examination process that would otherwise be manually performed by a pathologist or other user. This, in turn, relies on the ability of the system to identify not only the sample on the slide from other content, but to distinguish, without operator intervention, those portions of the sample necessary for making a diagnostic evaluation from those portions that are not needed. A high magnification image can be stored for each confirmed object of interest. The images are then available for retrieval by a pathologist to review for final diagnostic evaluation.

One current method of minimizing the storage capacity requirements of an automated microscope imaging system is to use image compression techniques. An imaging system captures high-power images of the entire microscope slide and each image is then compressed in order to reduce its storage capacity requirements. However, most compression techniques in use today utilize compression algorithms that are lossy and thus do not perfectly recreate the original image, i.e., the image suffers some distortion during the compression algorithm's encoding and decoding process.

U.S. patent application Ser. No. 2003-0163031, entitled, Method and System for Providing Centralized Anatomic Pathology Services, describes a method of providing centralized anatomic pathology services. A master storage, such as a database, of pathology information is maintained, the storage being accessible by pathologists associated with any regional laboratory via a communications link. Tissue samples requiring pathology processing are collected from a medical entity located in a first geographic region by a regional pathology laboratory. The tissue is processed, and a tissue slide is created. A digital, diagnostic quality image of the tissue slide is created and stored in the master storage. A pathologist, who may be remotely located with respect to the first geographic region, is provided with access to the stored diagnostic image via the communications link, to enable diagnosis by the pathologist without physical possession of the slide. The digital, diagnostic quality image may be compressed before it is stored in the master storage. The diagnosis may be a primary or a secondary diagnosis. In the case of a secondary or supplemental diagnosis, the pathologist is provided with access to any prior analysis and annotations, stored in the master storage, relating to the diagnostic image.

The '031 patent application, using wavelet compression, provides a means to optimize image storage capacity at the master storage location and transmission time across a communications link to a remote location. However, the wavelet compression method of the '031 patent application utilizes a lossy compression algorithm, whereby the compressed/decompressed image is different from the original digital image. These differences, though they may be subtle, could inhibit a pathologist from making an accurate diagnostic evaluation.

U.S. Pat. No. 6,272,235, entitled, Method and Apparatus for Creating a Virtual Microscope Slide, describes a method and apparatus for constructing a virtual microscope slide made up of digitally scanned images from a microscope specimen. The digitally scanned images are arranged in a tiled format convenient for viewing without a microscope, and for transferring the tiled images for viewing by another at a remote location. Several original microscope views at a low magnification are digitized and stored as digitized images coherently seamed together to-provide an overall virtual, macro image of the specimen at a lower resolution. Several original microscope views at higher magnifications are digitized and stored as digitized images coherently seamed together to provide virtual micro images at higher resolution. A data structure is formed with these virtual macro and micro digitized images along with their mapping coordinates. Preferably, a generic viewing program is also provided in the data structure that allows remote users to manipulate and interpret the tiled images on the user's monitor. Also, the data structure is formed with significantly compressed data so as to be transmitted over low bandwidth channels, such as the Internet, without loss of resolution that would interfere with the analysis at a remotely-located pathologist receiving the data structure over the Internet. The preferred interactive program allows the pathologist to scroll and view neighboring image areas of interest. A marker on the macro image indicates to the user the location of the micro image and assists the user in selecting areas from the macro image to be viewed at higher resolution and magnification.

While the '235 patent provides a means to selectively capture digital images at high magnification, rather than image the entire microscope slide using a high power objective, it relies on the user of the apparatus to manually select a region of interest for high magnification digital imaging. A user examines the macro image or original specimen for significant details. Typically, the user will highlight with a marking pen the areas to be viewed at higher magnification. The user then changes the magnification to a higher power objective, moves the microscope slide to bring the selected region into view, and begins to capture images of the selected region.

U.S. Pat. No. 5,978,498, entitled, Apparatus for Automated Identification of Cell Groupings on a Biological Specimen, describes the detection of cellular aggregates within cytologic samples. An image analysis system with an image gathering system includes a camera, a motion controller, an illumination system and an interface; the system obtains images of cell groupings. The image gathering system is constructed for gathering image data of a specimen mounted on a slide and is coupled to a data processing system. Image data is transferred from the image gathering system to the data processing system. The data processing system obtains objects of interest. A four step process finds cellular aggregates. The first step is acquisition of an image for analysis. The second step is extraction of image features. The third step is classification of the image to determine if any potential cellular aggregates may exist in the image. The fourth step is segmentation of objects which includes the substeps of detecting and locating potential cellular aggregates.

FIELD OF THE INVENTION

The present application relates to acquiring and analyzing digital images viewed through a computer-controlled automated microscope, such as using a computer-controlled automated microscope in an analysis of biological specimens.

DESCRIPTION OF RELATED ART

Personal Choice of Some Attorneys

SUMMARY OF THE INVENTION

The present disclosure includes systems and techniques relating to intelligently directed segmentation analysis for automated microscope systems. Implementations of the systems and techniques described here may occur in hardware, firmware, software or combinations thereof, and may include computer program instructions for causing a programmable machine to perform the operations described.

According to some implementations, an automated imaging system includes a microscope, a controller coupled with the microscope, and a display device coupled with the controller. The microscope can be a computer-controlled microscope electrically connected to the controller and including a barcode reader, a camera, a serial interface, one or more sensors, on or more motors, a light source, a turret, and a data interface. The controller can be configured to operate the microscope autonomously, to present image data on the display device, and to perform a cluster analysis operation.

The method of performing the cluster analysis operation can include setting operating parameters, performing a silhouette scan, calculating zelle parameters, performing cluster analysis on a set of zelle parameters, segmenting the zelles into groups, determining which resulting groups are valuable and which are not, determining how many high-power images to capture of each valuable cluster, capturing high-power images, and storing the images and associated data. The method can further include codifying knowledge derived from user interaction with the system, where this codifying can include displaying a low-magnification image, selecting a region to view at high-magnification, determining whether an image has been captured and stored of the selected location, displaying a high-magnification image of the selected location if it exists, or indicating the location of the most similar image that has been captured and stored, displaying the high-magnification image if the alternative location is acceptable, capturing and displaying a high-magnification image of the originally selected location if the alternative location is not acceptable, and storing attributes and parameters of the high-magnification image to build a knowledge-base that optimizes future use of the automated microscope imaging system.

According to further implementations, various methods of analyzing image data can be effected in a system, apparatus or article including a machine-readable medium storing instructions operable to cause one or more machines to perform operations of the method. For example, an apparatus can include an interface configured to connect with a microscope, and a controller configured to send signals through the interface to operate the microscope and to perform the operations of a method. The interface can include a serial interface and a data interface, and the controller can be a special-purpose or conventional computer.

The method can include obtaining an image of at least a portion of a scan region including a biological specimen, differentiating tissue of greater interest from tissue of lesser interest in the image based on a test being performed for the biological specimen and based on a cluster analysis of data from the image, and storing information for the tissue of greater interest, which falls in the scan region. The differentiating can include defining subimages in the image based on the test being performed for the biological specimen, determining one or more parameters of the subimages, performing the cluster analysis on the one or more parameters of the subimages, and identifying one or more areas in the subimages based on results of the cluster analysis, the one or more areas including the tissue of greater interest.

Obtaining the image can include performing a silhouette scan. The information storing can include retaining high resolution data for the tissue of greater interest, and discarding high resolution data for the tissue of lesser interest.

The defining subimages can include specifying subimage dimensions based on the test being performed for the biological specimen. The determining can include determining multiple parameters of the subimages, and the performing can include performing a multivariate statistical cluster analysis on the multiple parameters. The identifying can include selecting a proper subset of resulting clusters based on operating parameters set for the test being performed for the biological specimen. The method can further include obtaining one or more higher magnification images of the biological specimen in the one or more areas of the subimages, and the information storing can include saving the one or more higher magnification images.

The method can include obtaining one or more higher magnification image samples of a cluster until a predefined number of samples meeting a specified criteria have been obtained for the cluster. The method can include obtaining a higher magnification image sample of a cluster, the information storing can include saving the higher magnification image sample along with a lower magnification image of the cluster and information linking the higher magnification image sample with the lower magnification image, such that the higher magnification image sample is returned in response to a request for a high power image of a region in the lower magnification image, wherein the region does not overlap with the higher magnification image sample but is statistically similar to the higher magnification image sample according to the cluster. Obtaining the higher magnification image sample can include obtaining multiple samples covering representative members of the cluster, and the information storing can include saving the samples, the lower magnification image and the linking information in a single file for distribution.

The method (which can be realized in a system, apparatus or article) can include obtaining an image of at least a portion of a scan region including a biological specimen, subdividing the obtained image into a plurality of subimages, wherein the subdividing is based on a test being performed for the biological specimen, generating a derivative image wherein image units of the derivative image are derived from respective ones the subimages, performing an automated analysis of the derivative image to identify one or more areas of interest for the test, and storing information for the one or more areas of interest, which fall in the at least a portion of the scan region. Performing the automated analysis can include performing a multivariate statistical cluster analysis, and grouping quadrants of the obtained image based on results of the multivariate statistical cluster analysis and the test being performed for the biological specimen. Subdividing the obtained image can include specifying subimage dimensions based on the test being performed for the biological specimen.

The grouping can form groups of quadrants, and the performing the automated analysis can include selecting a proper subset of the groups based on the test being performed for the biological specimen to identify the one or more areas of interest. The grouping can form groups of quadrants, the performing the automated analysis can include determining a number of sample locations covering representative members of the groups based on the test, and the information storing can include saving lower magnification image data for the groups and higher magnification image data for the sample locations.

The method can include returning, in response to a request for a high power image of a first region in the lower magnification image data, at least a portion of the higher magnification image data corresponding to a second region with similar characteristics to the first region according to the multivariate statistical cluster analysis. The can further include updating a knowledge-base according to user input provided with respect to the at least a portion of the higher magnification image data returned, wherein the updated knowledge-base affects future applications of the multivariate statistical cluster analysis for the test.

The method (which can be realized in a system, apparatus or article) can include obtaining an image of at least a portion of a scan region including a biological specimen, partitioning the obtained image into zelles, determining one or more parameters of the zelles, performing a cluster analysis on the one or more parameters of the zelles, differentiating tissue of greater interest from tissue of lesser interest in the obtained image based on the cluster analysis and based on a test being performed for the biological specimen, and storing more information for the tissue of greater interest than information for the tissue of lesser interest. The cluster analysis can include a multivariate statistical cluster analysis, and the zelles can include test-dependent zelles. The method can include segmenting the zelles into clusters exhibiting similar characteristics among a portion of the one or more parameters determined to best cluster the zelles according to the cluster analysis. The method can further include determining which clusters contain zelles that most likely contain content that is valuable to a pathologist in making a diagnostic evaluation.

The method can include determining how many high-power images of zelles to retain for each cluster based on a knowledge-base codifying previous test experience. The method can include capturing the high-power images of zelles, analyzing the captured high-power images to determine if they meet specified criteria, and terminating the capturing once a sufficient number of high-power images have been acquired for the test according to the determining how many high-power images of zelles to retain.

The method can include presenting on a display device, in response to a request for a high power image of a first region, at least a portion of one or more of the high-power images, the at least a portion corresponding to a second region with similar characteristics to the first region according to the cluster analysis. Furthermore, the method can include updating the knowledge-base according to user input, wherein the updated knowledge-base affects future applications of the cluster analysis for the test.

One or more of the following advantages may be provided. A pathologist can be provided for viewing, in order to make an accurate assessment of a tissue sample or other specimen, one or more appropriate high-power, undistorted images. Images need not be compressed using lossy compression algorithms as only the most relevant portions of a slide can be scanned at high resolution as needed. Rapid data collection and reduced need for processing power in the automated microscope system can be realized. Digital images can be rapidly captured and stored, while minimizing storage requirements, yet preserving the quality of the original image.

The stored images on an automated microscope system allow a pathologist or other user to automate the process of finding, focusing, and viewing a specimen on a microscope slide. The typical process involves looking at the slide at a low magnification to determine where on the slide interesting samples are located, moving the slide such that an interesting area is centered in the field of view, increasing the power of the objective, and viewing the sample at a higher power to confirm it is of genuine interest and to make a diagnosis. An automated microscope system according to the present disclosure may determine where a specimen of interest lies on a microscope slide and also determine what portions of that specimen a pathologist or other user may find interesting. This can result in significant savings in processing time and image storage requirements as high-power images of every location on a microscope slide need not be captured and saved.

In many cases, the area of interest on a slide represents only a fraction of the entire sample. The present systems and techniques can be used to predict what areas of a microscope slide a pathologist may need to view, and to capture and store digital images of only those locations. An automated system can quickly identify and capture digital images of only those areas a pathologist or other user may need to view under higher magnification in order to complete a diagnosis, which can result in significant processing and storage efficiencies. In particular, the present systems and techniques can be used to minimize the storage requirements of digital microscopic images in such a way that the quality of the images is maintained, to minimize the acquisition time of digital microscopic images at high magnification objectives, and to identify areas of interest on a microscope slide to capture and store images at a high magnification objective.

Details of one or more embodiments are set forth in the accompanying drawings and the description below. Other features and advantages may be apparent from the description and drawings, and from the claims.

BRIEF DESCRIPTION OF THE DRAWINGS

These and other aspects will now be described in detail with reference to the following drawings.

FIG. 5 is a flow diagram of a method of codifying knowledge that can serve to optimize image data acquisition time and data storage, according to

DETAILED DESCRIPTION OF THE DRAWINGS

The systems and techniques described here relate to capturing and storing digital images for use with a computer-controlled automated microscope imaging system. A method can include analyzing a low-magnification image of the entire microscope slide to identify areas of interest. Next, quadrants that exhibit similar characteristics can be grouped together. Images of a subset of quadrants from each group can then be captured and stored at high magnification. In this manner, the data acquisition time and the image data storage requirements can be optimized, while still satisfying the needs of the pathologist or other user.

Figure 1:
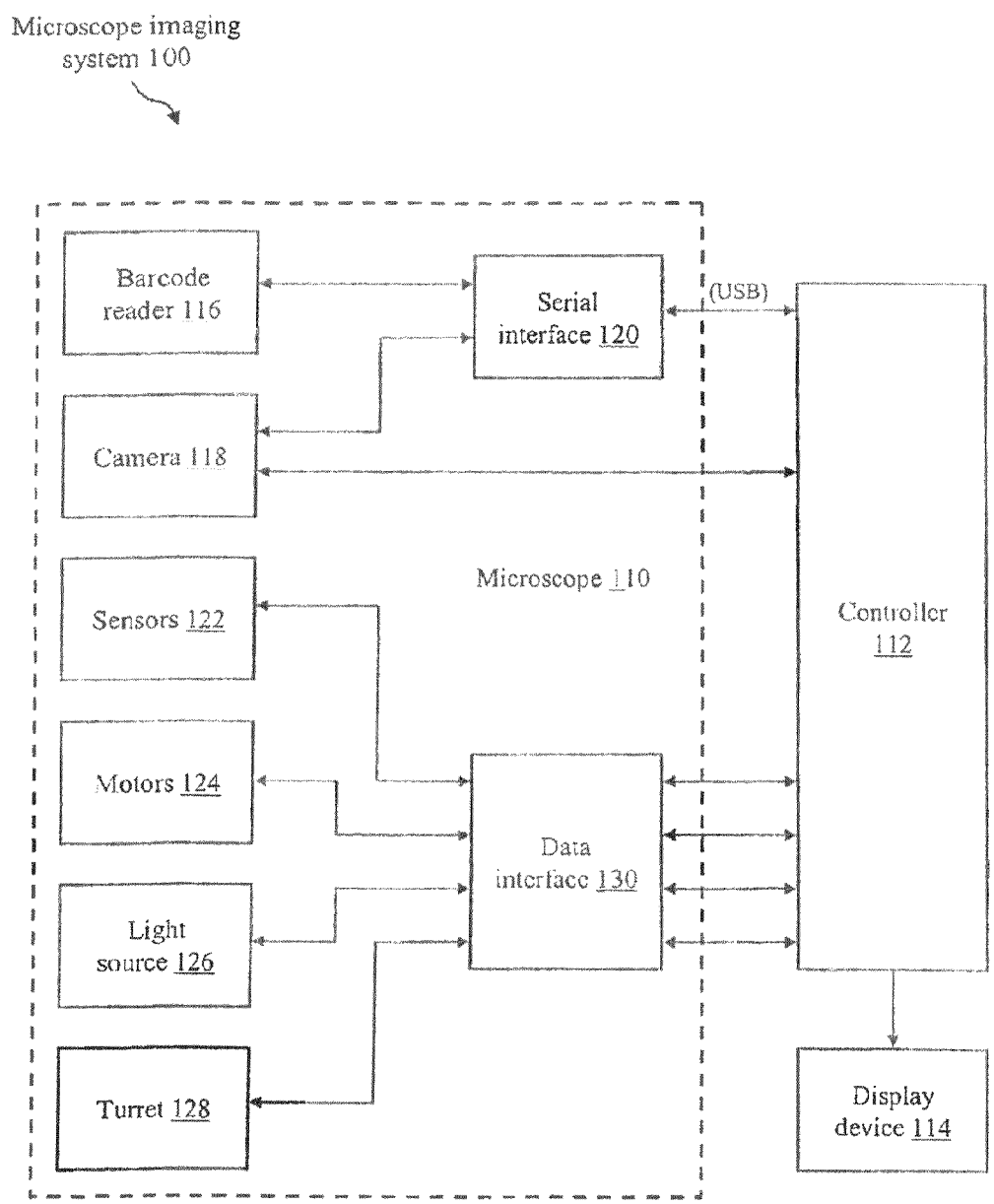
FIG. 1 is a block diagram showing a microscope imaging system, according to some implementations.

FIG. 1 illustrates a high-level functional diagram of a microscope imaging system 100. Microscope imaging system 100 is representative of a generalized imaging system suitable for use with the optimized image acquisition techniques described in detail in connection with FIGS. 2-5. Microscope imaging system 100 includes a microscope 110 that is electrically connected to a controller 112 that has a display device 114. Controller 112 is representative of any special-purpose or conventional computer, such as a desktop, laptop, or host computer. Controller 112 can be loaded with the appropriate software for controlling microscope imaging system 100, such as software for running image-processing algorithms and image analysis algorithms. Display device 114 can be any special-purpose or conventional display device (e.g., a computer monitor) that outputs graphical images to a user.

Microscope 110 is a computer-controlled microscope suitable for use in an automated imaging system. An example of microscope 110 is a Chroma Vision Automated Cellular Imaging System (ACIS). Microscope 110 can further include a barcode reader 116, a camera 118, a serial interface 120, one or more sensors 122, one or more motors 124, a light source 126, a turret 128, and a data interface 130.

Barcode reader 116 is a standard barcode reader capable of detecting an identifier upon, in the example of microscope imaging system 100, a standard microscope slide (not shown). Camera 118 is a digital camera that has selectable resolution capabilities. Camera 118 is mounted upon turret 128 of microscope 110, such that its aperture is aligned with the field of view (FOV) of any lens associated with turret 128. Barcode reader 116 and camera 118 can feed electrical inputs of serial interface 120, which facilitates a serial communication link between these elements and controller 112. For example, serial interface 120 can provide a USB (Universal Serial Bus) connection to controller 112. Furthermore, camera 118 can provide a direct video output connect to a video card (not shown) within controller 112 that gathers the image data from camera 118 for processing.

Sensors 122 include, but are not limited to, position sensors, temperature sensors, and light intensity sensors or optical encoders. Motors 124 can be conventional servomotors associated with the motion control of microscope 110, such as for rotating the appropriately powered lens within the optical path of microscope 110, for adjusting focus, or for controlling an automated microscope stage (not shown). Light source 126 can be any suitable light source for appropriately illuminating the FOV of microscope 110, such that the creation of a digital image of that FOV is possible. Turret 128 can be a conventional motor-driven microscope turret, upon which is mounted a set of lenses of varying power that may be rotated into the optical path of microscope 110. Turret 128 is also suitably controlled to provide the desired focus. Sensors 122, motors 124, light source 126, and turret 128 can feed electrical inputs of data interface 130. Data interface 130 can be a conventional system driver card, which facilitates a data communication link between these elements and a motion control card (not shown) within controller 112.

Although specific functions of microscope imaging system 100 are further described in reference to FIGS. 2 through 5, the generalized operation of microscope imaging system 100 is described in reference to FIG. 1, as follows. A continuous supply of standard microscope slides that have a biological sample deposited thereon is fed to the automated microscope stage of microscope 110 via an in-feed stage and, subsequently, is positioned in the FOV of microscope 110. Additionally, during the transition from the in-feed stage of microscope imaging system 100 to the microscope stage of microscope 110, the identifier (ID) of the target microscope slide is read by barcode reader 116. The target slide is subsequently scanned at various resolutions and magnifications, based on image-processing algorithms and image analysis algorithms executed by controller 112. Upon completion of the image scan operation, the slide is transferred out of microscope imaging system 100 via an out-feed stage (not shown), the slide ID and image data for that particular slide is transmitted to controller 112 and stored in memory, and the motion control system moves the next target slide into the FOV of microscope 110.

This process automatically repeats for each microscope slide that is automatically fed into microscope imaging system 100. It is noted that microscope imaging system 100 operates autonomously, i.e., a clinician can initiate microscope imaging system 100 and microscope imaging system 100 can subsequently operate automatically without human intervention, so long as a supply of microscope slides is available at its in-feed stage and no system errors occur. At any time, however, a clinician may view and/or manipulate the digital image of any given slide via controller 112 and display device 114 for the inspection and analysis of any given specimen, as is well known in anatomic pathology. This is possible because controller 112 can reconstruct the image by using the image data associated with the contiguous FOVs and the image registration information.

Figure 2A:
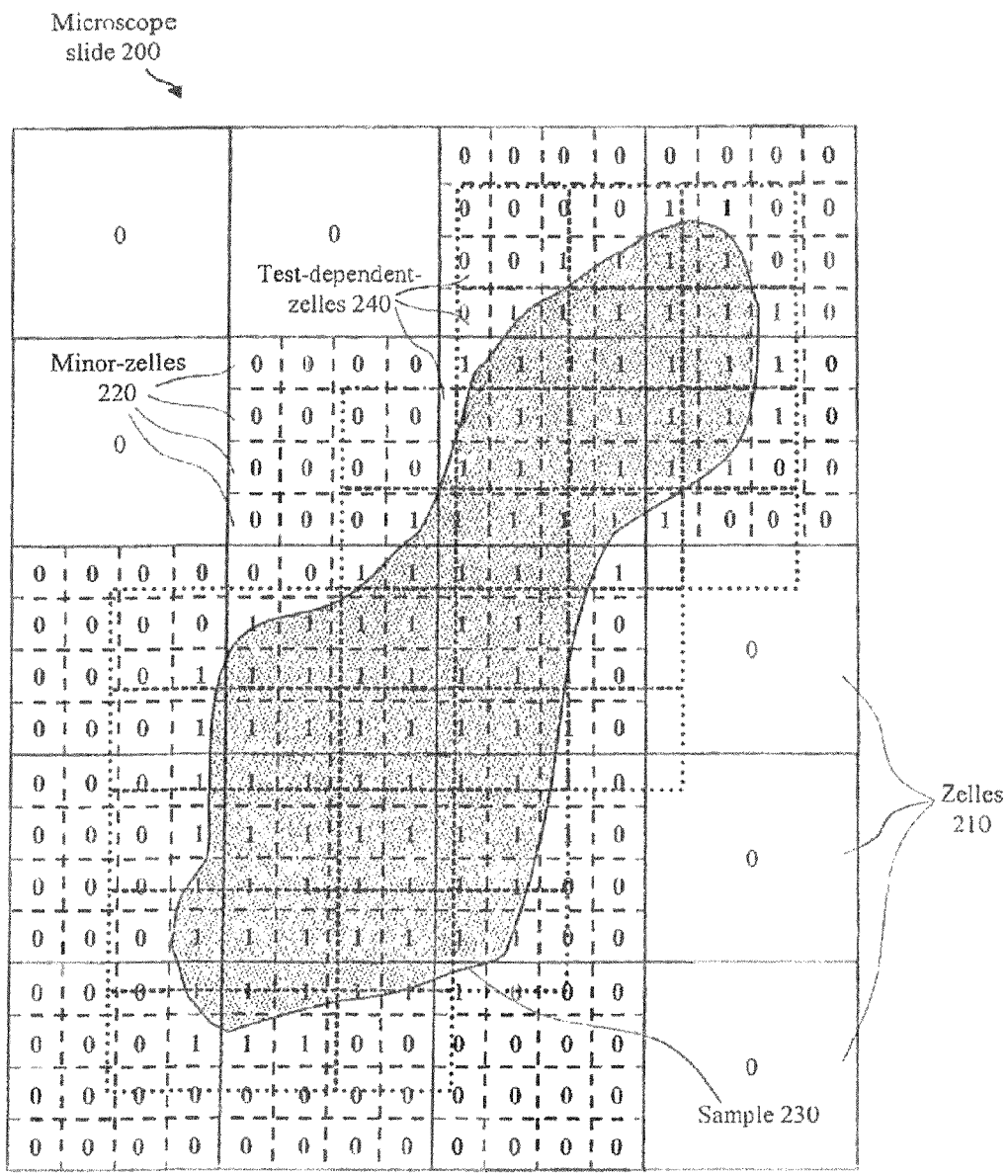
FIGS. 2A and 2B show an expanded view of interesting and non-interesting regions of a microscope slide including area partitioning, according to some implementations.

FIG. 2A illustrates an expanded view of a microscope slide 200 and specimen resulting from microscope imaging system 100 having performed a silhouette scan operation, as detailed in U.S. patent application Ser. No. 10/413,493 (U.S. Pub. No. 2004-0202357 A1), filed Apr. 11, 2003, and entitled, Silhouette Image Acquisition, which is hereby incorporated by reference. FIG. 2A illustrates that microscope slide 200 can be partitioned into an array of contiguous segments or zelles 210 covering the entire area of microscope slide 200. The area of each zelle 210 can be defined by the power (i.e., magnification) setting of microscope 110. Those skilled in the art will appreciate that a microscopic FOV reduces very substantially as the magnification increases. Zelles 210 may overlap slightly or abut. Overlap may be useful to ensure that no region is missed due to mechanical inaccuracies in the X, Y stage of microscope 110, and depending upon the smallness of the expected target. Zelles 210 can be representative of the FOVs, in which low magnification and resolution are used; thus, operation time and the amount of stored image data can be minimized. Additionally, a low-power lens has a greater depth of focus, so that microscope 110 can search for tissue without having to refocus. The low-power lens of microscope 110 can be focused at either a best-guess z-plane or a z-plane derived from microscope calibration. Moreover, the present systems and techniques can employ the focusing systems and techniques described in U.S. Patent Application No. TO BE DETERMINED, filed MONTH DAY, YEAR, and entitled, System for Method of Focusing for Automated Microscope Systems, which is hereby incorporated by reference.

Any zelle 210 found to have specimen content can be classified as interesting and mapped as a logical 1. By contrast, any zelle 210 found to have no specimen content can be classified as non-interesting and mapped as a logical 0. In this manner, a silhouette of the specimen, i.e., a sample 230, is formed, as shown in FIG. 2A, thereby creating what is effectively a low-resolution image that may be processed using standard image-processing algorithms. An image table can be generated that represents the low-resolution image of sample 230.

Parameters are set depending on the test and application for analyzing each zelle 210 and determining whether there is anything of interest in each zelle 210. A statistical algorithm (e.g., a multivariate statistical cluster analysis) can be run to determine whether there is anything of interest in each zelle 210. The classification of areas of interest can be uniquely peculiar to each particular application (test). For example, a priority may be set for blue stain, red stain, any speck of tissue, or specifically a large volume of tissue to be classified as interesting. Consequently, the biological requirements of each particular test determine what is of interest and, thus, determine the parameters. Therefore, each zelle 210 can be analyzed using predetermined parameters for a particular test using associated algorithms that determine whether what is found in each zelle 210 matches the predetermined criteria and is therefore classified as interesting.

Microscope slide 200 can be further partitioned. Statistically, based upon the entire area of a particular zelle 210, there may be very little material of interest within zelle 210. One way to handle this is to arbitrarily subdivide each zelle 210 into yet smaller regions using data processing. As an example, FIG. 2A illustrates that each zelle 210 can be further partitioned into an array of contiguous minor-zelles 220, thereby forming an array of minor-zelles 220 covering the entire area of microscope slide 200.

Like zelles 210, the interestingness of these yet smaller minor-zelles 220 can be assessed via image-processing algorithms and image analysis algorithms. This can be done in preparation for a future operation of collecting and saving a series of higher magnification images, as only the interesting regions may need be examined at a higher magnification. Although not a requirement, minor-zelles 220 may be designed to match the anticipated FOVs of the higher power images of later phases of operation. The size of minor-zelles 220 and whether minor-zelles 220 match up with the anticipated FOVs of the higher power images can be adjustable system parameters.

Using image-processing algorithms and image analysis algorithms (which can be executed by controller 112) minor-zelles 220 found to have specimen content can be classified as interesting and mapped as a logical 1. By contrast, any minor-zelles 220 found to have no specimen content can be classified as non-interesting and mapped as a logical 0. In this manner, a yet more precise silhouette of sample 230 can be formed, thereby creating a slightly higher-resolution image that may be processed using standard image-processing algorithms. It is further understood that silhouette scan could continue to process microscope slide 200 further into yet smaller minor zelles.

Figure 2B:
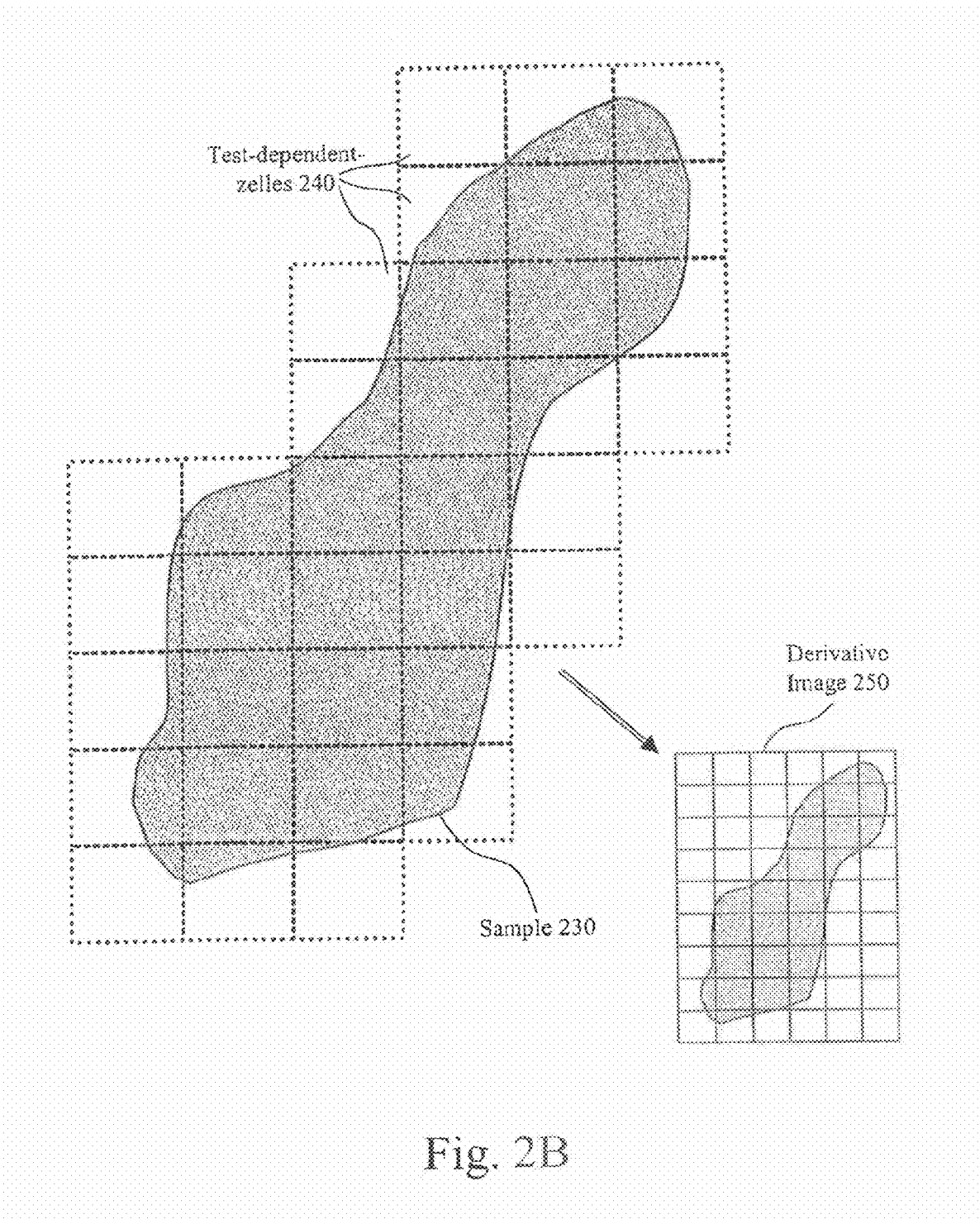

In general, any acquired image (whether it be a single FOV image or a composite image stitched together from multiple FOVs) can be subdivided into a plurality of subimages based on the test being currently performed for the biological specimen 230. The dimensions of the subimages can be specified by the parameters of the test. For example, the test can specify a size for the zelles used in the cluster analysis described below, and these test-dependent zelles 240 can be arranged to fully cover the specimen 230 based on the minor zelles 220 found in the silhouette scan (as shown in FIGS. 2A and 2B). Thus, the size of the zelles and whether the zelles match up with the anticipated FOVs for later image acquisition are adjustable system parameters, which can depend on the test being run. Likewise, the test-dependent zelles can be used to derive a new image 250 that may be processed using various image-processing algorithms; standard image-processing algorithms, such as those that dilate, erode, or assess whether pixels of an image are isolated or connected, can be run on the derivative image 250. Thus, the zelles can be understood as source data for pixels of a new image to be processed, and the pixels of this new image indicate certain characteristics of the tissue in the corresponding zelles as determined by the derivation procedure.

After image tables are generated, the image data associated with non-interesting regions may be discarded, thereby optimizing the storage space requirements upon controller 112. Furthermore, after image tables are generated, microscope imaging system 100 may perform any image-processing and analysis algorithm as desired. For example, microscope imaging system 100 can determine whether microscope slide 200 contains a valid sample 230 or whether sample 230 meets distribution expectations, and so on.

Figure 3:
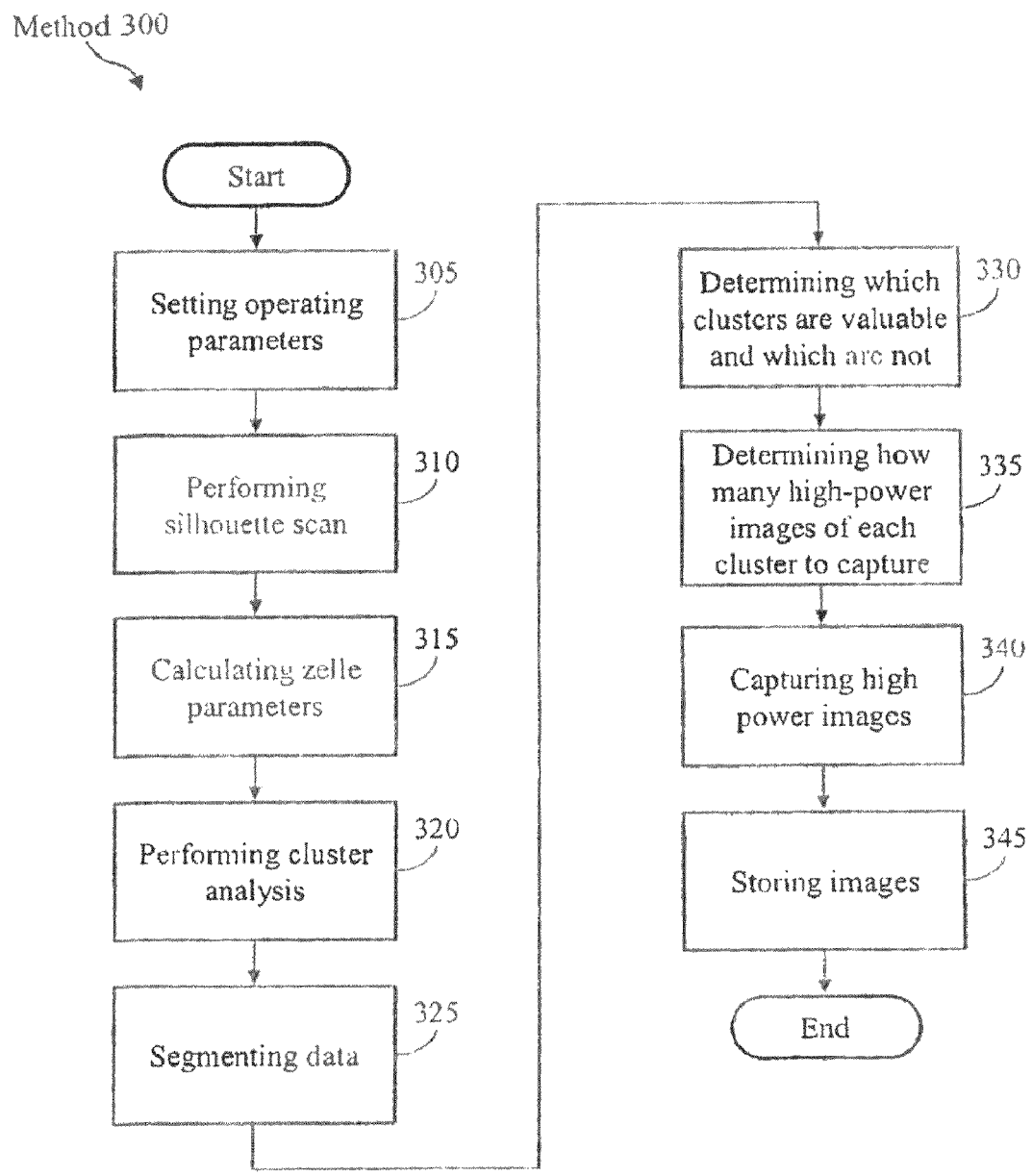
FIG. 3 is a flow diagram of a method of performing a cluster analysis operation that can serve to optimize image data acquisition time and data storage, according to some implementations.

FIG. 3 illustrates a flow diagram of a method 300 for performing intelligent, directed segmentation that optimizes image data acquisition time and image data storage requirements. By first forming groups of zelles with similar characteristics and then imaging (or retaining) only a few representative zelles of each group, the data acquisition time and image data storage requirements can be significantly improved.

At 305, operating parameters can be set. Microscope imaging system 100 can set operating parameters that are used to enhance the operation of subsequent operations and improve the confidence of the resulting clusters or groupings. Operating parameters can include functions, constants or inputs, which can be derived from rules-of-thumb that are based upon prior knowledge and attributes of the microscope slide 220, cover slip 240, or sample 230. For example, parameters may include the expected specimen color, size, features, or distribution, and may also be related to the test being run. Parameters may also include the thickness of microscope slide 200 or of sample 230 operating parameters can be derived by associating prior knowledge data already stored within microscope imaging system 100 with a unique identifier on microscope slide 200, such as a barcode. In addition, a user may manually enter additional information or parameters directly via a graphical user interface designed for accepting operating parameters to microscope imaging system 100. Operating parameters may also be derived from a knowledge base that is continuously updated. As the knowledge base grows, the system learns from previous results and improves the operation of subsequent tests. The system can thus become more efficient and the results can be more accurate over time. The process of updating the knowledge base is described in further detail below in connection with FIG. 5.

At 310, a silhouette scan can be performed. Microscope imaging system 100 can differentiate interesting vs. non-interesting tissue (e.g., fat tissue versus stroma based on color and texture, or tumor versus no tumor based on color and texture) in areas (e.g., zelles 210, 220 or 240) in a high-resolution, low-magnification image. Microscope slide 200 (or just the portions of the slide 200 that contain tissue) can be partitioned into an array of contiguous segments, or zelles, that cover the entire area. The area of each zelle can be defined by the power (i.e., magnification) setting of microscope 110, by the test being performed, or a combination of these. The X, Y coordinates of each zelle can be captured and stored in the memory of microscope imaging system 100. The interesting zelles are those that have a higher probability of containing the biological specimen. These zelles have one or more statistics or parameters that have exceeded a specified threshold.

At 315, zelle parameters can be calculated. Microscope imaging system 100 can collect and calculate data for each interesting zelle. Stored in the memory of microscope imaging system 100, the data can be associated with a particular zelle from which it came. Data or parameters collected on an interesting zelle may include location coordinates, lightness and darkness, color, variation in the color, edginess, variation/standard deviation of power of the pixel values (brightness), different colors represented and ratios of colors, number of non-white pixels, number of nuclei, or average size of nuclei.

Figure 4:
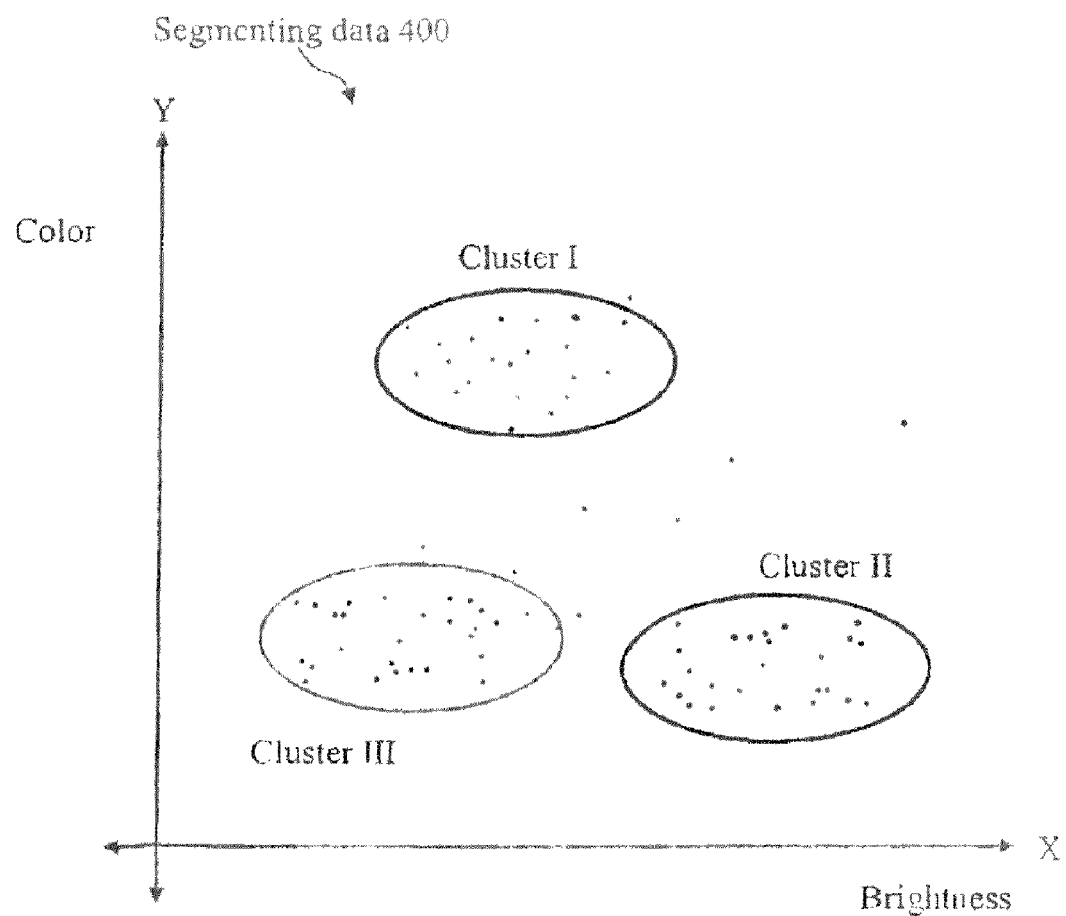
FIG. 4 shows segmentation of zelles across two variables and segmentation of data into discrete groups or clusters, according to some implementations.

At 320, a cluster analysis can be performed. Microscope imaging system 100 can analyze the parameters calculated at 315 from each zelle to determine how well a particular parameter-is able to cluster the zelles. A cluster is a group of zelles that exhibit similar characteristics in a particular parameter or set of parameters. For example, FIG. 4 depicts a two-dimensional plot of segmenting data 400, which is representative of sample data analyzed across the two-dimensional brightness-color space. For the purposes of simplicity, the data is depicted only in the two-dimensional space. However, in practice, zelles may be analyzed in a 3+ multi-dimensional space, wherein each dimension corresponds to one of the parameters calculated at 315. In FIG. 4, each zelle has a score corresponding to its average brightness and a score corresponding to its average color. If one were to analyze the zelles by only the brightness parameter, it would be readily apparent that the zelles are uniformly distributed across a broad range. No discernable groups would be evident. If the zelles were analyzed by only the color parameter, two groups could be recognized. One group would contain the zelles of a Cluster I in FIG. 4 and another group would contain the zelles of Clusters II and III in FIG. 4. By analyzing the data across both the brightness and color dimensions together, three discrete clusters are evident, as indicate in FIG. 4. A cluster analysis algorithm can take into account a parameter's ability to cluster the data on its own as well as with other variables. The results of the cluster analysis allow microscope imaging system 100 to determine which parameters are able to cluster the data and which parameters provide no helpful cluster information. Operating parameters set at 305 can provide to microscope imaging system 100, in advance, the zelle parameters expected to best cluster zelles for a particular specimen type or diagnostic test, further optimizing the efficiency of microscope imaging system 100. Those parameters that are not able to provide any meaningful information can be ignored, which can further improving the efficiency and speed of the processing.

At 325, the data can be segmented. Microscope imaging system 100 can form groups or clusters of zelles exhibiting similar characteristics among those parameters determined at 320 to best cluster the data. For example, FIG. 4 depicts sample data segmented by brightness and color. Three clusters are readily identifiable. Cluster II includes those zelles that are very bright but contain very little color; Cluster I includes those zelles that are not quite as bright but have quite a bit more color; and Cluster III includes those zelles that are neither bright nor contain much color. This example, for the purposes of simplicity, shows zelles segmented in the two-dimensional brightness-color space. However, in practice, zelles may be segmented in the n-dimensional space, where n is the number of parameters determined at 320 to be useful in creating clusters.

At 330, a determination can be made as to which clusters are valuable and which are not. Microscope imaging system 100 can use operating parameters set at 305 to determine which clusters contain zelles that most likely contain content that is valuable to a pathologist in making a diagnostic evaluation. There may be several clusters formed as a result of the data segmentation at 325. One or more of these clusters may not contain any valuable information a pathologist needs in analyzing sample 230. However, one or more other clusters may contain zelles critical to analyzing sample 230 and making an accurate diagnostic evaluation. Working with only those clusters determined to contain valuable content allows data acquisition time and image data storage requirements to be optimized, while still satisfying the needs of the pathologist or other user. The knowledge-base, further explained in method 500, can assist microscope imaging system 100 in determining, in advance, which clusters most likely contain valuable content. It is further understood that if little or no a priori knowledge is available as operating parameters, microscope imaging system 100 can determine that all clusters are valuable by default.

At 335, a determination can be made as to how many high-power images of each cluster to capture. Using operating parameters at 305, microscope imaging system 100 can determine how many high-power images of zelles to capture from each valuable cluster as determined at 330. By capturing and storing images of only a sample of zelles that fall into one of the identified clusters, method 300 can reduce the image storage capacity requirements, increase the speed and efficiency of the process, and ensure high-power images are available for the interesting areas a pathologist is likely to want to view. In some embodiments, microscope imaging system 100 determines the number of high-power images to capture based partly on the digital image storage capacity of the system. In some embodiments, microscope imaging system 100 determines the number of high-power images to capture based on the knowledge-base and previous experience capturing images of similar specimen types or diagnostic tests.

At 340, high-power images can be captured. Microscope imaging system 100 can capture digital images of zelles belonging to clusters containing valuable content, as determined at 330. This can be done in an order corresponding to a ranking of zelles in the clusters, which ranking can be based on statistical characterization of the zelles in view of the test being performed (e.g., the percentage of different stain colors, the number of identifiable objects, such as cell nuclei, the ratio of the number of cell nuclei of one color versus another, etc.). Moreover, the high-power digital image capture can involve additional automated analysis of the captured high resolution images to determine if they meet specified criteria (e.g., the number of chromosomes in a cell nuclei), and the image capture can then terminate once a sufficient number of high-power images have been acquired for the test (e.g., the operating parameters can specify the number of criteria-meeting samples to acquire at high power, such as one hundred cells having a specified number of deoxyribonucleic acid (DNA) probe attachments to the nucleus in the case of a fluorescence in situ hybridization (FISH) test).

At 345, acquired images can be stored. The high-power power images can be saved for future viewing in the memory of microscope imaging system 100. Associated with each stored image can be data related to the coordinates and parameters of the zelles pictured in the digital image.

Figure 5:
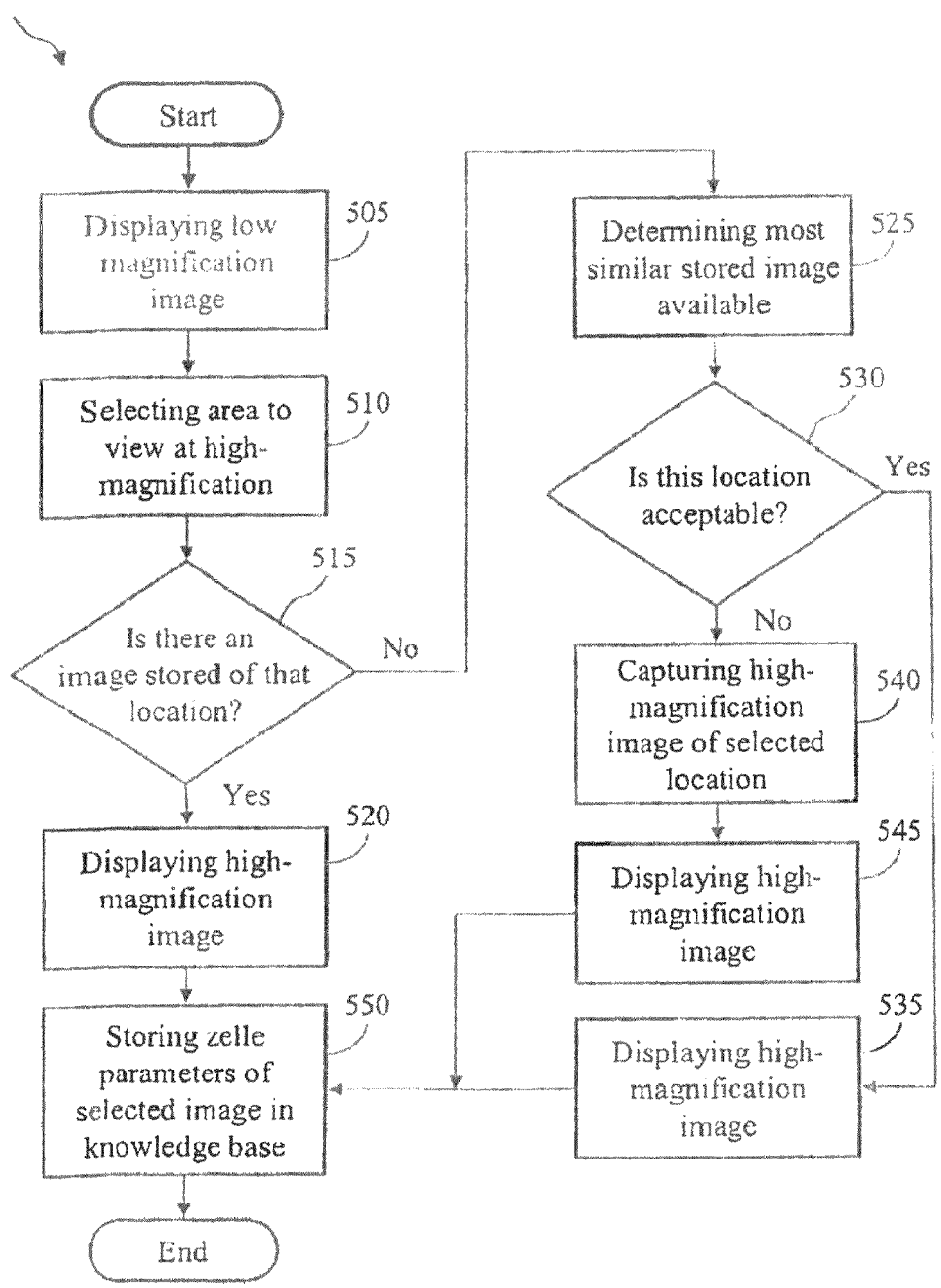

FIG. 5 shows a flow diagram of method 500 of codifying the knowledge gained from a pathologist's experience of manually identifying regions of a biological specimen that need to be viewed at higher magnification and are essential in making a diagnostic evaluation. This codified knowledge, or knowledge-base, can be used to set operating parameters at 305 of method 300 and can be used to optimize the ability of microscope imaging system 100 to perform many of the operations of method 300. In particular, a knowledge-base can be used to improve the ability of microscope imaging system 100 to identify parameters at 320 of method 300 that are best able to form groups or clusters of zelles with similar characteristics. A knowledge-base can also be used to improve the ability of microscope imaging system 100 to differentiate between the resulting clusters, as at 330 of method 300, and identify those clusters that are valuable from those that do not contain any useful information. This differentiation can involve differentiating diagnostically valuable tissue from non-diagnostically valuable tissue for the given test.

At 505, a low-magnification image can be displayed. Microscope imaging system 100 can display a reconstructed image of microscope slide 200 and sample 230 on display device 114. At 510, an area can be selected for viewing at high-magnification. A pathologist or other expert can view the image on display device 114 and select a particular region to view under higher magnification. The choice of what region to select is based on the experience of the pathologist having viewed and diagnosed many similar specimens in the past. The pathologist has the ability to quickly recognize an area on a low-magnification image that contains valuable content necessary to perform a diagnostic evaluation.

At 515, a check is made as to whether there is an image stored of the selected location. The microscope imaging system 100 can determine whether a high-power image of or including the location selected at 510 was previously captured and stored in the memory of microscope imaging system 100 at 340 of method 300. If so, the high magnification image can be displayed at 520. The microscope imaging system 100 can display the high-power image selected at 510 on display device 114.

If a high-power image of the selected location was not previously captured and stored, the most similar stored image available can be determined at 525. The microscope imaging system 100 can determine which high-power image previously captured and stored in the memory of microscope imaging system 100 at 340 of method 300 is most similar to or exhibits the closest characteristics of the region selected at 510. The alternative image can be of a zelle from the same cluster as a zelle from the region originally selected by the pathologist, but may not necessarily be located near to the region originally selected by the pathologist.

At 530, a determination can be made as to whether the location of the alternative image is acceptable. The microscope imaging system 100 can indicate to the user the location upon microscope slide 200 where there exists a digital image previously captured and stored in the memory of microscope imaging system 100 that is most similar to or exhibits the closest characteristics of the region selected at 510. The pathologist or other user can be prompted to indicate whether this alternative region will suffice in making their diagnostic evaluation. If so, the alternative high-magnification image can be displayed at 535. The microscope imaging system 100 can display the alternative high-power image proposed at 530 on display device 114.

If the alternative image is not acceptable, a high-magnification image of the originally selected location can be captured at 540. The microscope imaging system 100 can move microscope slide 200 to the coordinates of the region selected at 510 and capture a high-power image of that location and/or display the location live to the user. At 545, the new high-magnification image can be displayed. The microscope imaging system 100 can display the high-power image captured at 540 on display device 114.

At 550, zelle parameters of the selected image can be stored in the knowledge base. The microscope imaging system 100 can store in its memory the information and parameters related to those regions as determined and selected by the pathologist to be useful in making a specific diagnostic evaluation on a particular sample 230. Microscope imaging system can determine which parameters, combination of parameters, and value ranges form clusters that contain only those zelles located in the region(s) selected by the pathologist. By having an expert identify the areas of microscope slide 200 that are critical to making an effective diagnostic evaluation, and then determining what the common characteristics are of those locations, microscope imaging system 100 can learn how to automate the process of identifying those areas on microscope slide 200 that a pathologist needs to view at high-power in order to make a diagnosis for similar specimen types and for similar diagnostic tests. This information can then be used on similar diagnostic tests and specimen types in the future to make more accurate assessments as to the characteristics of valuable content and which parameters form meaningful clusters. The knowledge-base feeds back to the operating parameters for use in future tests as described at 305 of method 300.

The processes described above, and all of the functional operations described in this specification, can be implemented in electronic circuitry, or in computer hardware, firmware, software, or in combinations of them, such as the structural means disclosed in this specification and structural equivalents thereof, including potentially a program (stored in a machine-readable medium) operable to cause one or more programmable machines including processor(s) (e.g., a computer) to perform the operations described. It will be appreciated that the order of operations presented is shown only for the purpose of clarity in this description. No particular order may be required for these operations to achieve desirable results, and various operations can occur simultaneously. For example, the logic flows depicted in FIGS. 3 and 5 do not require the particular order shown, sequential order, or that all operations illustrated be performed, to achieve desirable results. In certain implementations, multitasking and parallel processing may be preferable.

The various implementations described above have been presented by way of example only, and not limitation. Thus, the principles, elements and features described may be employed in varied and numerous implementations, and various modifications may be made to the described embodiments without departing from the spirit and scope of the invention. Accordingly, other embodiments are within the scope of the following claims.

The invention claimed is:

1. A method comprising:
obtaining an image of at least a portion of a scan region including a biological specimen;
subdividing the obtained image into a plurality of subimages, wherein the subdividing is based on a test being performed for the biological specimen;
generating a derivative image wherein image units of the derivative image are derived from respective ones of the subimages;
performing an automated analysis of the derivative image to identify one or more areas of interest for the test, wherein the performing the automated analysis comprises: performing a multivariate statistical cluster analysis; and grouping quadrants of the obtained image based on results of the multivariate statistical cluster analysis and the test being performed for the biological specimen; and
storing information for the one or more areas of interest, which fall in the at least a portion of the scan region.

2. The method of claim 1, wherein the subdividing the obtained image comprises specifying subimage dimensions based on the test being performed for the biological specimen.

3. The method of claim 1, wherein the grouping forms groups of quadrants, and the performing the automated analysis further comprises selecting a proper subset of the groups based on the test being performed for the biological specimen to identify the one or more areas of interest.

4. The method of claim 1, wherein the grouping forms groups of quadrants, the performing the automated analysis further comprises determining a number of sample locations covering representative members of the groups based on the test, and the information storing comprises saving lower magnification image data for the groups and higher magnification image data for the sample locations.

5. The method of claim 1, further comprising returning, in response to a request for a high power image of a first region in the lower magnification image data, at least a portion of the higher magnification image data corresponding to a second region with similar characteristics to the first region according to the multivariate statistical cluster analysis.

6. The method of claim 5, further comprising updating a knowledge-base according to user input provided with respect to the at least a portion of the higher magnification image data returned, wherein the updated knowledge-base affects future applications of the multivariate statistical cluster analysis for the test.

7. An automated imaging system comprising: a microscope; a controller coupled with the microscope; and a display device coupled with the controller; wherein the controller is configured to operate the microscope autonomously, to present image data on the display device, and to perform operations including: obtaining an image of at least a portion of a scan region including a biological specimen; partitioning the obtained image into zelles; determining one or more parameters of the zelles; performing a cluster analysis on the one or more parameters of the zelles; segmenting the zelles into clusters exhibiting similar characteristics among a portion of the one or more parameters determined to best cluster the zelles according to the cluster analysis; differentiating tissue of greater interest from tissue of lesser interest in the obtained image based on the cluster analysis and based on a test being performed for the biological specimen; and storing more information for the tissue of greater interest than information for the tissue of lesser interest.

8. The system of claim 7, wherein the cluster analysis comprises a multivariate statistical cluster analysis, and the zelles comprise test-dependent zelles.

9. The system of claim 7, wherein the operations further include determining which clusters contain zelles that most likely contain content that is valuable to a pathologist in making a diagnostic evaluation.

10. The system of claim 7, wherein the operations further include determining how many high-power images of zelles to retain for each cluster based on a knowledge-base codifying previous test experience.

11. The system of claim 10, wherein the operations further include capturing the high-power images of zelles, analyzing the captured high-power images to determine if they meet specified criteria, and terminating the capturing once a sufficient number of high-power images have been acquired for the test according to the determining how many high-power images of zelles to retain.

12. The system of claim 10, wherein the operations further include presenting on the display device, in response to a request for a high power image of a first region, at least a portion of one or more of the high-power images, the at least a portion corresponding to a second region with similar characteristics to the first region according to the cluster analysis.

13. The system of claim 12, wherein the operations further include updating the knowledge-base according to user input, wherein the updated knowledge-base affects future applications of the cluster analysis for the test.

14. An apparatus comprising: an interface configured to connect with a microscope; and a controller configured to send signals through the interface to operate the microscope and to perform operations including: obtaining an image of at least a portion of a scan region including a biological specimen; partitioning the obtained image into zelles; determining one or more parameters of the zelles; performing a cluster analysis on the one or more parameters of the zelles; segmenting the zelles into clusters exhibiting similar characteristics among a portion of the one or more parameters determined to best cluster the zelles according to the cluster analysis; differentiating tissue of greater interest from tissue of lesser interest in the obtained image based on the cluster analysis and based on a test being performed for the biological specimen; and storing more information for the tissue of greater interest than information for the tissue of lesser interest.

15. The apparatus of claim 14, wherein the cluster analysis comprises a multivariate statistical cluster analysis, and the zelles comprise test-dependent zelles.

16. The apparatus of claim 14, wherein the operations further include determining which clusters contain zelles that most likely contain content that is valuable to a pathologist in making a diagnostic evaluation.

17. The apparatus of claim 14, wherein the operations further include determining how many high-power images of zelles to retain for each cluster based on a knowledge-base codifying previous test experience.

18. The apparatus of claim 17, wherein the operations further include capturing the high-power images of zelles, analyzing the captured high-power images to determine if they meet specified criteria, and terminating the capturing once a sufficient number of high-power images have been acquired for the test according to the determining how many high-power images of zelles to retain.

19. The apparatus of claim 17, wherein the operations further include presenting on the display device, in response to a request for a high power image of a first region, at least a portion of one or more of the high-power images, the at least a portion corresponding to a second region with similar characteristics to the first region according to the cluster analysis.

20. The apparatus of claim 19, wherein the operations further include updating the knowledge-base according to user input, wherein the updated knowledge-base affects future applications of the cluster analysis for the test.

* * * * *

UNITED STATES PATENT AND TRADEMARK OFFICE
CERTIFICATE OF CORRECTION

| | |
|---|---|
| PATENT NO. | : 8,116,543 B2 |
| APPLICATION NO. | : 12/460079 |
| DATED | : February 14, 2012 |
| INVENTOR(S) | : Cynthia B. Perz et al. |

It is certified that error appears in the above-identified patent and that said Letters Patent is hereby corrected as shown below:

Column 3, Line 50, please delete "on" and insert therefor --one--;
Column 5, Line 39, please delete "The" and insert therefor --They--;
Column 7, Line 52, please delete "Chroma Vision" and insert therefor --ChromaVision--;
Column 9, Lines 18-19, please delete "TO BE DETERMINED" and insert therefor --11/343,544--;
Column 9, Line 19, please delete "MONTH DAY, YEAR" and insert therefor --January 30, 2006--;
Column 11, Line 43, please delete "eter-is" and insert therefor --eter is--;
Column 15, Claim 7, Line 64, please delete ";" and insert therefor --:--.

Signed and Sealed this
Sixteenth Day of October, 2012

David J. Kappos
*Director of the United States Patent and Trademark Office*